United States Patent Office 2,883,128
Patented Apr. 21, 1959

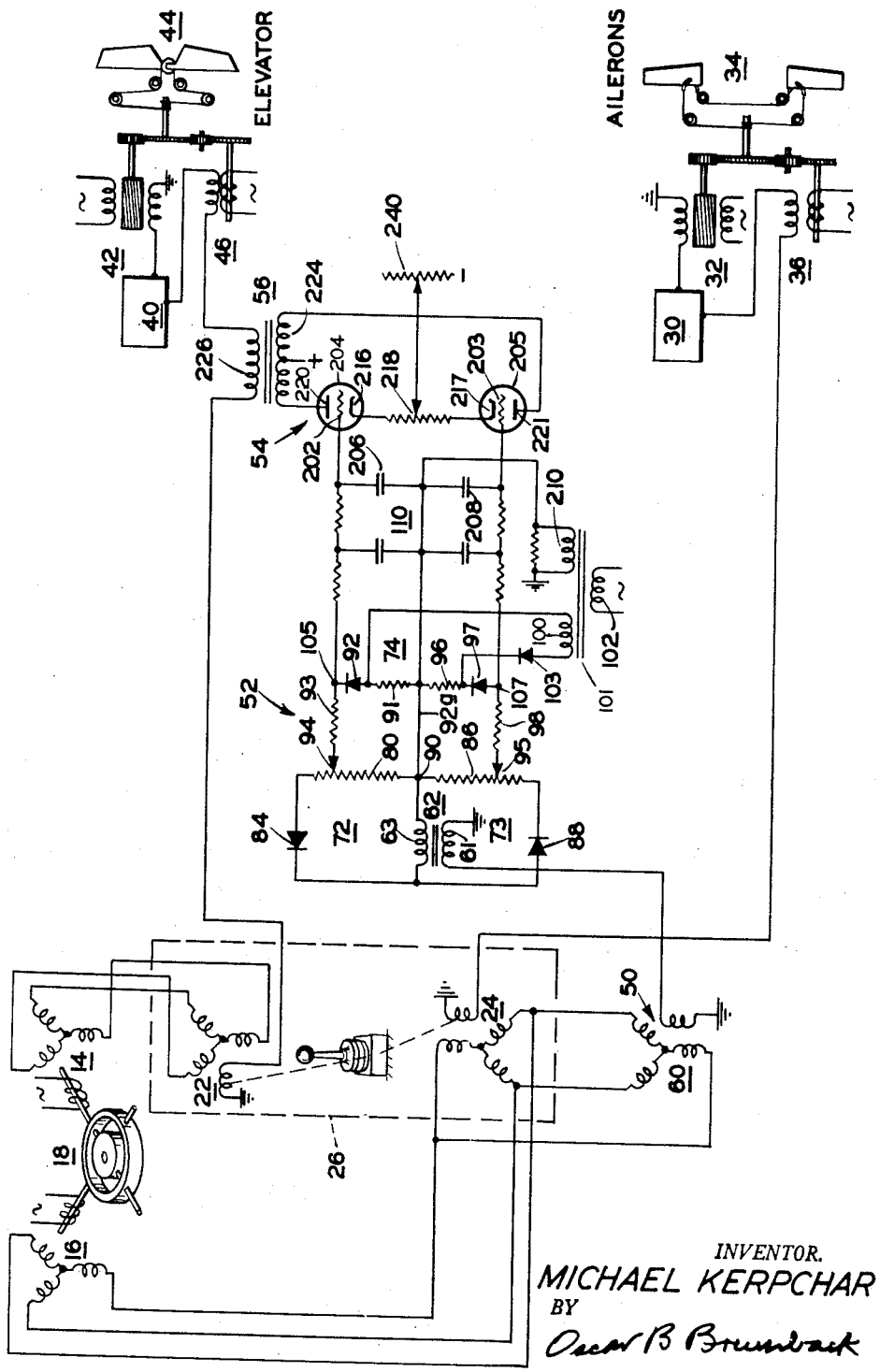

2,883,128

AIRCRAFT ELEVATOR CONTROLS DURING TURNS

Michael Kerpchar, Clifton, N.J., assignor to Bendix Aviation Corporation, Teterboro, N.J., a corporation of Delaware Application June 5, 1953, Serial No. 359,821

13 Claims. (Cl. 244—77)

This invention relates generally to control systems and more particularly to turn control systems for aircraft.

When an aircraft is in straight and level flight an equilibrium of forces exists: the thrust developed by the propellers is balanced by the drag developed by the friction of the air; and the weight of the craft is balanced by the lift developed by the wings. Banking the aircraft, in effect, has a component of the lift pull the craft horizontally so that the lift available to balance the weight is decreased by this horizontal component which turns the craft from its straight course and keeps it in a curved course. Accordingly, to prevent the craft from losing altitude, it is necessary to increase the lift so that the vertical component of lift will balance the weight of the craft. This may be done by increasing the angle of attack, thereby increasing the lift. A lifting of the elevators, an up-elevator action, lifts the nose of the aircraft thereby increasing the angle of attack.

An object of the invention, therefore, is to provide a novel apparatus for keeping an airborne vehicle at a constant altitude as the vehicle makes a turn.

Another object is to provide a novel apparatus to lift the elevators of an aircraft to increase the lift of the craft as it turns.

A further object is to provide a novel electric circuit for obtaining a uniphase output from a biphase input.

Another object is to provide independent adjustments to compensate for the tendency of an aircraft to lose altitude as it makes a right or a left turn.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the single sheet of drawing, the single figure illustrates schematically a complete wiring diagram for the novel turn compensation system of the present invention in cooperative association with an automatic pilot system.

The automatic pilot system in which the present invention is shown as being embodied may be of the type described in U.S. Patent No. 2,625,348 issued January 13, 1953, to Noxon et al. For simplicity and a better understanding of the present invention, only the pitch and roll control channels of the automatic pilot system are illustrated.

In the above automatic pilot system, pick-offs 14 and 16 on a conventional vertical gyro 18 are inductive signal generators which operate as transmitters to develop signals corresponding to deviations from a predetermined pitch and roll attitude, respectively. Similar inductive signal generators 22 and 24 in a manual controller 26, which may be of the type described in U.S. Patent No. 2,553,280, issued May 15, 1951, operate as receivers for the attitude signals.

The rotors of inductive devices 22 and 24 are manually displaced to pitch and bank the craft respectively, and the signals from the attitude take-offs 14, 16 are modified by the position of the rotors of the receivers 22, 24. When an error in the position of the rotors of the attitude take-offs and the inductive receiving devices in the manual controller exists, a signal develops which corresponds in amplitude to the amount of error and in phase to the direction of error. As the aircraft banks to the left for example, a signal of one phase develops and as the aircraft banks to the right a signal of opposite phase develops.

After amplification in a conventional amplifier 30, the bank error signal energizes a servomotor 32 to operate the ailerons 34 to correct for the error. A follow-up device 36 develops a signal corresponding to the displacement of the surface from its normal position to modify the signal to prevent hunting. In a similar manner an error signal to the elevators upon a change in pitch attitude is amplified by an amplifier 40, and operates a servomotor 42 to move the elevators 44 to correct for the change, a follow-up device 46 also modifying the reference signal to prevent hunting.

The foregoing automatic pilot system is subject to a loss of altitude during turns because of a component of the lift being lost by the banking. The novel device of the present invention for compensating for this tendency to lose altitude as the craft turns may be comprised generally of a receiving section 50 responsive to the bank attitude of the craft, a detector section 52 for determining the direction of the banking and developing a corresponding direct current signal, a modulation section 54 for developing an alternating current signal corresponding to the direct current, and a coupling transformer 56 for coupling the signal into the elevator channel.

Receiver section 50 is comprised of an inductive device 60 with a relatively fixed rotor and is connected to receive the bank attitude signal from inductive device 16. When an error in position between the rotors of inductive device 16 and receiver 50 exists, the signal which is developed is applied to the primary winding 61 of a coupling transformer 62 and develops a signal across a secondary winding 63. This secondary winding is a common lead for a pair of rectifying networks 72 and 73 in detection station 52 where the direction of the banking is determined.

Detecting the direction of the banking of the aircraft is necessary since different increases in the angle of attack are required for left and right turns; the tendency to lose altitude being particularly great during a turn to the left because of the gyroscopic effect of the propellers turning in a clockwise direction.

The detection station 52 is comprised of rectifying networks 72 and 73 and a control network 74. Network 72 includes secondary winding 63, a potentiometer 80 and a rectifier 84. Network 73, similarly, includes a potentiometer 86, and rectifier 88. Since the rectifiers 84 and 88 have their polarities in the same direction, the common junction 90 of potentiometers 80 and 86 always is of the same polarity. Control network 74 is comprised of a lead 92a connected to junction 90 and in parallel with wipers 94 and 95 of potentiometers 80 and 86; the connection to wiper 94 being by way of a resistor 91, a rectifier 92 and a resistor 93 and to wiper 95 by way of resistor 96, a rectifier 97 and a resistor 98. A secondary winding 100 of a power transformer 101 is connected across resistors 91 and 96, the connection including a rectifier 103.

As is well known, rectifiers 84 and 88 will permit direct current to flow in networks 72 and 73 only in the direction of the arrows indicating the rectifiers. As an alternating current signal is applied to coupling transformer 62, a direct current will flow in network 72 during one-half cycle of the alternating current and in network 73 during the other half cycle. By making the potential developed across potentiometer 80 effective for generating a signal for the automatic pilot for a turn to the left, for example, and the potential developed across potentiometer 86 effective for a turn to the right, individual adjustments can be made by wipers 94 and 95 to provide for the relative up-elevator actions required. This is accomplished in the action of control circuit 74.

Control circuit 74 shunts circuit 72 and blocks circuit 73 for a turn in one direction and shunts circuit 73 and blocks circuit 72 for a turn in the other direction. Accordingly, a pulsating potential of one polarity (negative) will appear at junction 105 for a turn in one direction and a pulsating potential of the opposite polarity (positive) will appear at junction 107 for a turn in the other direction. Secondary winding 100 of power transformer 101 through rectifier 103 provides the necessary pulsating voltage to rectifiers 92 and 97 for shunt and blocking circuits 72 and 73. The energization of secondary winding 100 is such that as a signal is received at primary winding 61 of transformer 62 in phase with the alternating current energizing primary winding 102 of transformer 101, rectifier 97 is blocked. At the same time the bias on rectifier 92 is so decreased that any potential appearing across resistor 93 is shorted by rectifier 92. When a signal appears at winding 61 which is in phase opposition to the voltage across winding 102, the bias on rectifiers 92 and 97 is such that rectifier 92 is blocked and the signal across resistor 98 is shorted through rectifier 97. Thus it can be seen that for a signal of one phase, representing a turn in one direction, circuit 72 will provide a negative pulsating voltage; and for a signal of the opposite phase, representing a turn in the other direction, circuit 73 will provide a positive pulsating voltage.

The direct current impulses at terminals 105 and 107 of resistors 93 and 98 are of pulsating nature so a conventional resistance-capacitance filter network 110 is provided to smooth the pulses.

Modulator network 54 develops an alternating current proportional to the direct current signal across filter network 110. To form such a network, the control grids 202 and 203 of a pair of vacuum tubes 204 and 205 are connected across capacitors 206 and 208 of filter network 110. The junction of these capacitors is energized by a secondary winding 210 of transformer 101 to provide a source of operating potential for the grids. The cathodes 216 and 217 of the tubes are connected together and through a common variable resistor 218 to a variable bias resistor. Changing the position of the tap of resistor 218 serves to balance the output of the tubes. The plates 220 and 221 of the tubes are connected to the opposite ends of the primary winding 224 of coupling transformer 56, the center tap of primary winding 224 being connected to a suitable direct current source.

Secondary winding 210 of transformer 101 will supply an alternating current voltage simultaneously to both grids 202 and 203 of tubes 204 and 205 so that under a no-signal condition from transformer 62 both tubes create voltages in the primary winding 224 of transformer 56. These voltages are equal in magnitude and are applied to primary winding 224 oppositely so that there will be no voltage induced in secondary winding 226. A positive direct current signal across condenser 208 of filter network 110 will increase the trans-conductance of tube 205, and unbalance coupling transformer 56 so that an alternating current of one phase predominates at the secondary winding 226. A negative direct current signal across condenser section 206 of filter 110 will decrease the trans-conductance of tube 204 so that an alternating current of the same phase appears at the secondary winding.

A signal of one phase applied to input transformer 62 produces a negative voltage at grid 202 of tube 204 to reduce the output of tube 204, and a signal of opposite phase applied to input transformer 62 produces a positive voltage on grid 203 of tube 205 to increase the output of tube 205. Therefore, the voltage developed at secondary winding 226 in response to a signal of either phase across transformer 62 is always of fixed phase regardless of the phase of the input signal.

The reversal of phase of one signal is accomplished in transformer 56 by decreasing the effect of one of the two sections of primary winding 224. The two sections of primary winding 224 are balanced during no-signal conditions at primary winding 61 of coupling transformer 62 and the potentials at junctions 105 and 107 of control network 74 are such that the excitation of grids 202 and 203 of tubes 204 and 205 by secondary winding 210 of transformer 101 provides equal trans-conductance of the tubes. The equal and opposite currents in primary winding 224 cancel one another, and no voltage appears at secondary winding 226.

A signal, however, appearing at primary winding 61 of coupling transformer 62 renders rectifiers 84 and 88 conductive during opposite half cycles and changes the potential at one terminal 105 or 107. When the phase of the signal at secondary winding 63 with reference to phase of the signal at secondary winding 100 is such that the conduction of rectifier 92 is blocked, the conduction of rectifier 84 lowers the potential at junction 105, correspondingly lowering the potential on grid 202 of tube 204; the trans-conductance of tube 204 and the potential developed in the left-hand section of primary winding 224 is decreased. A balanced condition no longer exists in winding 224, and the right-hand section prevails to develop a corresponding voltage in secondary winding 226. At this time, rectifier 97 shunts the potential at junction 107 and the trans-conductance through tube 205 remains unchanged. When the signal at transformer 62 renders rectifier 88 conductive and is of a phase such that the excitation of winding 100 blocks rectifier 97, the potential at junction 107 is raised, correspondingly increasing the potential at grid 203. The increased trans-conductance of tube 205 raises the potential developed by the right-hand section of primary winding 224, and unbalances primary winding 224 so that a corresponding voltage develops at winding 226. From the foregoing it is clear that the voltage of the right-hand winding always prevails to develop in secondary winding 226 a signal of fixed phase regardless of the phase of the input signal.

For steep bank angles, particularly where the power of the aircraft motors has been set up for level flight, there may be insufficient thrust to get the high lift necessary without stalling the aircraft. It is desirable, therefore, to limit the output of the modulator to a definite maximum value.

The output of the modulator illustrated herein is limited by the action of the common cathode resistor 240. As long as tubes 204 and 205 are operating on the straight portion of the grid voltage-plate current characteristic curve of the tubes, the total current flowing through cathode resistor 240 will remain substantially constant because as the current through one tube is increased, the current through the other tube is decreased by an equal amount. As one of the tubes approaches cut-off condition, no further decrease of current through the cathode resistor due to this tube will occur, and any further increase of plate current through the other tube will cause a corresponding increase in voltage across the cathode resistor; hence, no further increase in output of modulator can be effected by increasing the D.C. input voltage. In other words, when one tube approaches cut-off, the cathode resistance will have a degenerating effect on the other tube, preventing any further increase in output voltage from the modulator for a D.C. drop across the capacitors 206 and 208. The value of resistor 240 may be adjusted by movement of its wiper.

In operation, a displacement of the rotor of inductive device 24 by manual controller 26 causes an error signal whose amplitude is proportional to the angle of displacement while the direction, left or right, of the displacement determines its phase. After amplification by amplifier 30, the signal operates motor 32 to move the ailerons 34, banking the aircraft. As the shaft of motor 32 turns, the rotor of the follow-up device 36 is displaced and a follow-up signal which is opposite in phase to the error signal builds up. This reduces and finally cancels the error signal. With zero signal, the motor stops with the ailerons displaced an amount proportional to the signal.

As the displaced ailerons place the aircraft in a banked condition, a relative displacement of the rotor and stator of inductive device 16 occurs. As the error in position of the rotors of inductive devices 16 and 24 decreases, the error signal decreases; the follow-up signal now prevails to operate the servomotor to return the aileron to a streamlined position; and the aircraft continues in a banked condition and curved path.

As the aircraft assumes a banked condition, the error signal which develops at inductive device 60 has a phase dependent upon the direction of banking. This signal is impressed across coupling transformer 62 and applied to networks 72 and 73 and results in direct current flow in circuits 72 and 73. Consequently, unidirectional voltages of opposite polarities appear across resistors 80 and 86.

When the signal at primary winding 61 of transformer 62 is in phase with the voltage at primary winding 102 of transformer 101, the operation of one rectifier 92 or 97 is blocked while the other rectifier operates to shunt the voltage from an associated resistor 93 or 98 to lead 92a. Only the voltage across the resistor whose associated rectifier is blocked appears across filter 110 on the grid of tube 204 or 205 of modulator 54. Thus, the relative signal strength may be varied for turns to the right and left by adjusting wipers 94, 95 of potentiometers 80, 86.

For a no-signal condition, the outputs of tubes 204 and 205 are equal; transformer 56 is balanced; and no output signal appears in secondary winding 226. A signal at the output of filter 110 always causes tube 205 to conduct more than tube 204. Tube 204 conducts less when a signal input at transformer 62 is of one phase and tube 205 conducts more when the signal is of opposite phase.

Whether the aircraft turns to the left or right, a signal is developed at transformer 56 to operate servomotor 42 to cause an up-elevator action, thereby lifting the nose of the craft and increasing the angle of attack so that the craft maintains a constant altitude.

The foregoing has presented a novel circuit in which an output of fixed phase is developed from an input signal of reversible phase. Adjustments in amplitude can be made for the output of either phase. Thus, the circuit provides an up-elevator action for aircraft so that adjustment can be made to provide the proper elevator action for turns to the right and left.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. An electric circuit comprising two parallel circuits having a common input and individual outputs, means for applying a signal of reversible phase to said input, means in each circuit to control the direction of current at said outputs, means responsive to the phase of the signal for selectively shunting the flow of current at one of said outputs, and modulating means responsive to the flow of current from the other of said outputs for developing a signal of fixed phase.

2. An electric circuit comprising two parallel circuits having a common input and individual outputs, means for applying a signal of reversible phase to said input, means in each circuit to control the direction of current at said outputs, means for individually adjusting the outputs, means responsive to the phase of said signal for selectively shunting one output, and a modulator responsive to the other output for developing a signal of fixed phase.

3. An electric circuit comprising two parallel circuits having a common input and individual outputs, means for applying a signal of reversible phase to said input, means in each circuit to control the direction of current at said outputs, means responsive to said signal for selectively shunting the flow of current from one of said outputs, and means responsive to said other output for developing a signal of fixed phase.

4. An electric circuit comprising two parallel circuits having a common input and individual outputs, means for applying a signal of reversible phase to said input, means in each circuit to control the direction of current at said outputs, means for individually adjusting the outputs, means responsive to said signal for selectively shunting the flow of current from one of said outputs, modulator means responsive to said output for developing a signal of fixed phase.

5. A compensator for the steering apparatus of aircraft to maintain the craft at constant altitude during a turning maneuver by energizing a servomotor to raise the elevators of said craft, comprising reference means responsive to banking of the craft for developing a signal of reversible phase whose amplitude depends upon the extent of bank of the craft and whose phase depends upon the direction of bank, detecting means operatively connected with said reference means and responsive to the phase of said signal for developing a direct current signal whose magnitude is proportional to the amplitude of said first signal and including adjustment means for limiting the magnitude of said signals, modulating means operatively connected with said detecting means and responsive to said direct current signal for developing a third signal of fixed phase whose amplitude corresponds to the magnitude of the direct current signal, and means connecting said last-named means with said servomotor for energizing the latter to raise said elevators.

6. An electrical device having an input for receiving an alternating current input signal of reversible phase, detecting means operatively connected with said input and including means for developing a direct current signal in response to said alternating current signal during a portion of a cycle of said signal and means for developing another direct current signal in response to said alternating current signal during a subsequent portion of a cycle of said alternating current signal, a modulator means responsive to said direct current signals for developing an alternating current signal, and a control means responsive to the phase of said input signal and connecting said modulator and said direct current signal developing means for selectively shunting one direct current signal from said modulator.

7. An electrical device having an input for receiving an alternating current signal of reversible phase, detecting means operatively connected with said input and having means for developing one direct current signal during one portion of a cycle of said input signal and another direct current signal during the subsequent portion of a cycle of the input signal, modulator means responsive to said direct current signals for developing an alternating current output signal of fixed phase, and control means operatively connecting said detector means and said modulator means for selectively controlling the appearance of one of said direct current signals at said modulator.

8. An electrical device comprising an input means for receiving an alternating current input signal, rectifier means operatively connected with said input means for developing a direct current signal from said input signal, modulator means for receiving said direct current signal and developing an alternating current signal, and control means connecting said direct current signal developing means and said output means for selectively controlling the appearance of the direct current signal at said modulator means, said control means being a shunt circuit including a rectifier and a means to bias the rectifier, whereby when a bias is applied to the rectifier no signals flow through said shunt circuit and the signal appears at said modulator and upon removal of the bias the signal flows through said shunt and does not appear at said modulator.

9. An automatic pilot system for an aircraft which banks in turning and has an elevator surface, comprising a servomotor for operating said surface, reference means responsive to banking of the craft for developing a reference signal corresponding in phase to the direction of banking of said craft, means operatively connected with said reference means for detecting the phase of said reference signal and developing a corresponding output and including means for individually adjusting the output for each phase of said reference signal, means operatively connected with said reference means and responsive to said output for developing a signal of fixed phase, and means connecting said last-named means and said servomotor for operating the latter.

10. In a device of the kind described, two circuits having individual outputs and a common input for receiving an alternating current signal of reversible phase, rectifying means in each circuit to provide unidirectional voltages of opposite polarities at the outputs of said circuits, and means responsive to the phase of the signal for selectively shunting the voltage at one of said outputs so that the voltage at the other output is effective.

11. In a device of the kind described, two parallel circuits having individual outputs and a common input for receiving an alternating current signal of reversible phase, rectifying means in each circuit to provide unidirectional voltages of opposite polarities at the outputs of said circuits, means for individually adjusting the voltages at the outputs of said circuits, and means responsive to the signal for selectively shunting the voltage at one of said outputs as determined by the phase of the signal so that only the voltage at the other output is effective.

12. A device of the kind described, comprising two parallel circuits having individual outputs and a common input for receiving an alternating current signal of reversible phase, rectifying means in the circuits to provide direct current voltages of opposite polarities at the outputs, means responsive to the phase of the signal and cooperating with the outputs of the electrical circuits and selectively shunting the voltage at one of the outputs, and means responsive to the other output for developing an alternating current signal of fixed phase irrespective of the phase of the input signal.

13. An automatic pilot system for an aircraft having a control surface for controlling the pitch attitude of the craft, reference means responsive to banking of the craft for providing an alternating current signal corresponding in phase to the direction of banking of the craft, a pair of parallel circuits having a common input for receiving the signal and having individual outputs, rectifying means in the circuits to provide direct current voltages of opposite polarities at the outputs, means cooperating with the outputs of the electrical circuits and selectively shunting the voltage at one of the outputs as determined by the phase of the signal, means responsive to the other output for developing an alternating current signal of fixed phase irrespective of the phase of the input signal, and means responsive to the signal of fixed phase and operating said surface.

References Cited in the file of this patent

UNITED STATES PATENTS

| | | |
|---|---|---|
| 2,531,188 | Yates | Nov. 21, 1950 |
| 2,555,019 | Webb | May 29, 1951 |
| 2,585,162 | Noxon | Feb. 12, 1952 |